Oct. 22, 1929.　　　H. G. HILL　　　1,732,811
TESTING MACHINE FOR LUBRICANTS
Filed Nov. 26, 1924　　　4 Sheets-Sheet 3

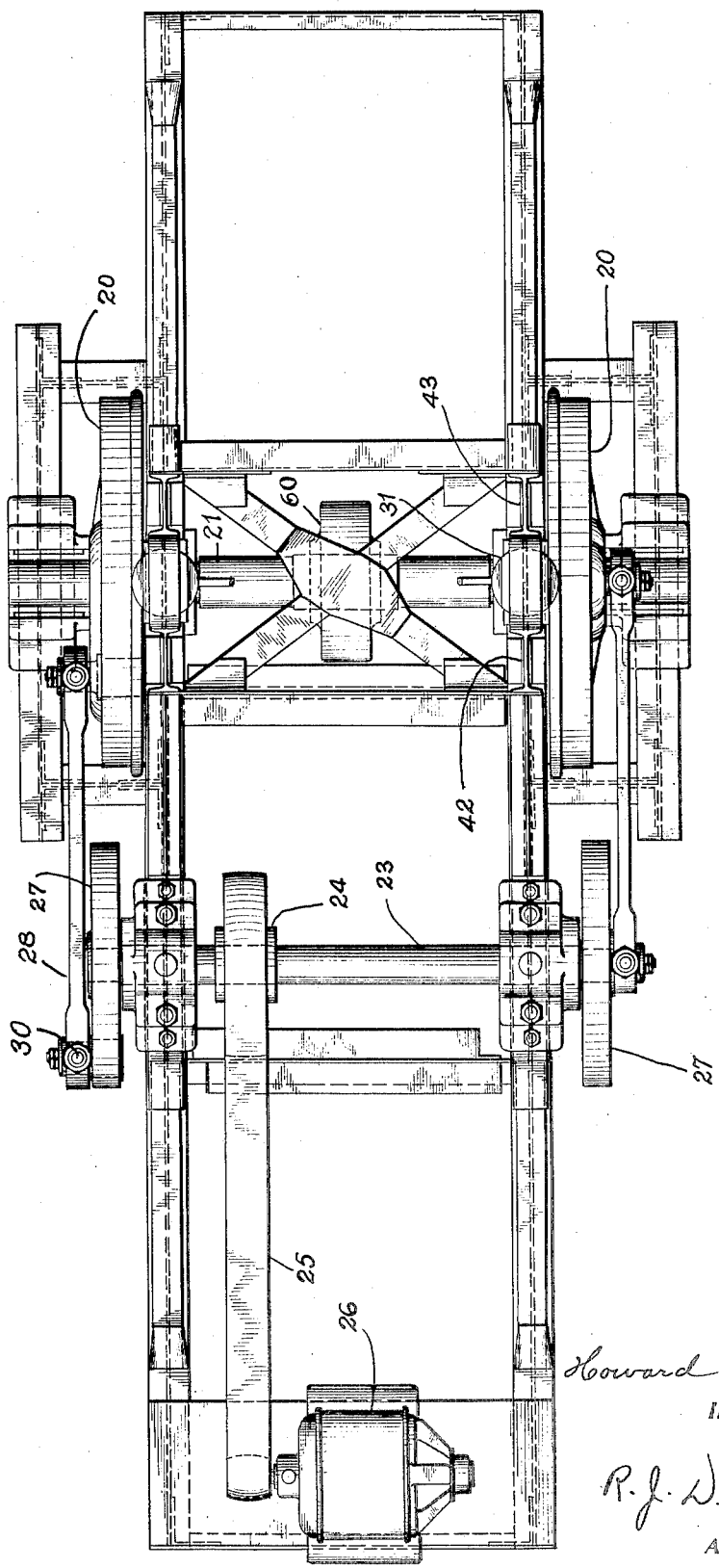

Inventor
Howard G. Hill
R. J. Dearborn
attorney

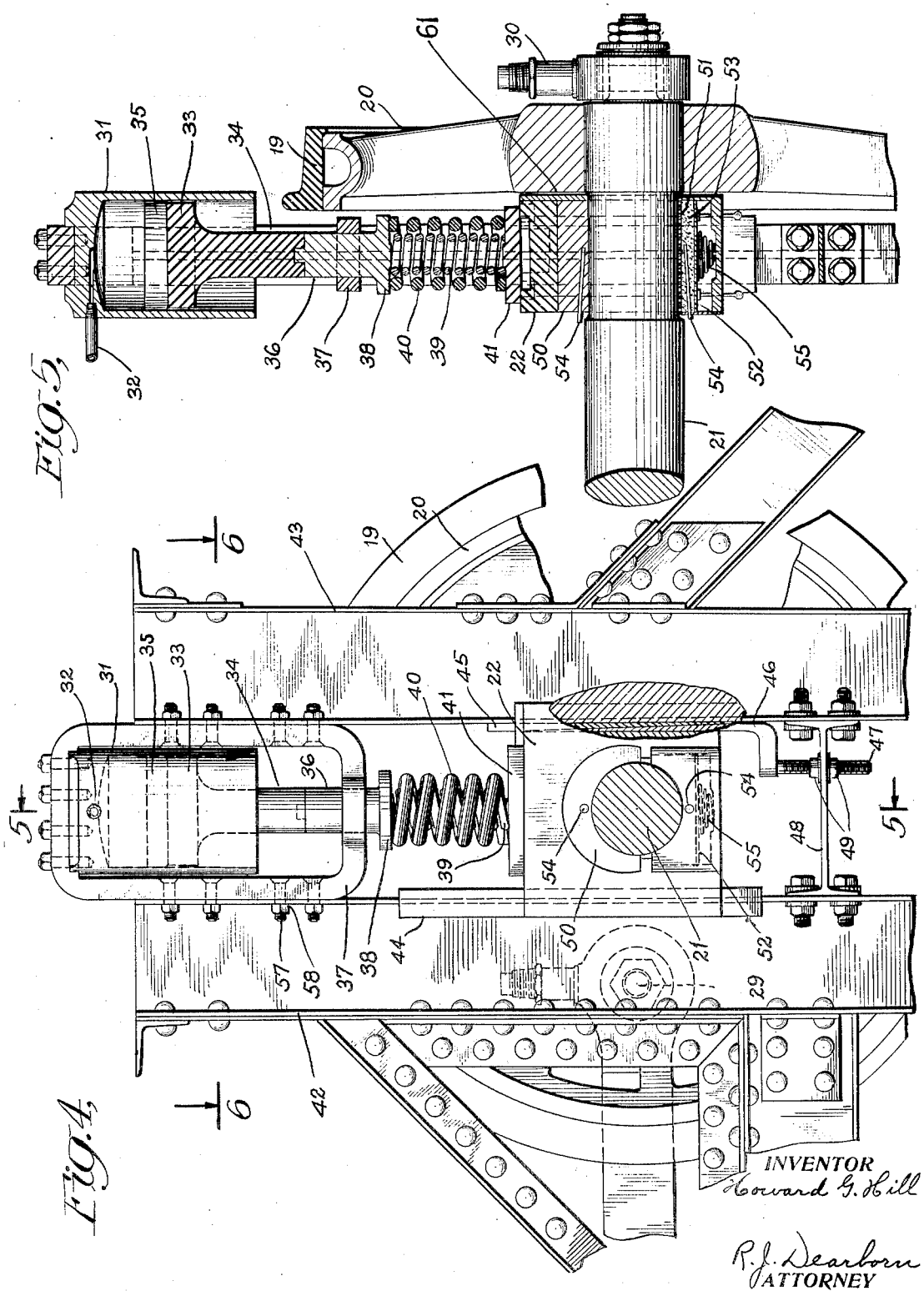

Patented Oct. 22, 1929

1,732,811

UNITED STATES PATENT OFFICE

HOWARD G. HILL, OF ROANOKE, VIRGINIA, ASSIGNOR, BY MESNE ASSIGNMENTS, TO THE TEXAS COMPANY, OF NEW YORK, N. Y., A CORPORATION OF DELAWARE

TESTING MACHINE FOR LUBRICANTS

Application filed November 26, 1924. Serial No. 752,290.

This invention relates to testing machines for lubricants and has special reference to the provision of apparatus for testing lubricants, such as locomotive greases, particularly driving journal grease and rod cup grease.

One object of the invention is to provide apparatus for simulating, as closely as possible, the conditions actually and generally present in locomotive driving journals and crank pins under operating conditions.

Another object of the invention is to provide means for conducting uniform tests of lubricating grease, so that accurate comparisons can be made of the different lots tested.

Another object of the invention is to provide a testing apparatus for lubricants wherein the lubricant can be subjected to varying pressures such as would ordinarily be encountered in the actual operation of a locomotive.

A still further object is to provide a testing apparatus wherein the lubricant under test can be subjected to test while certain parts of the apparatus are being subjected to the strains and thrusts ordinarily sustained by a locomotive while running on either curved or straight track.

Another object is to provide an apparatus of the class described above which is comparatively simple to construct and inexpensive to operate and which will truly simulate the conditions present during the operation of a locomotive.

Other objects, advantages and features of the invention will appear as the description thereof proceeds.

In the drawings:

Figure 2 is a plan view of the same machine.

Figure 4 is an enlarged view of a portion of the machine, parts thereof having been broken away to show the details of construction.

Figure 5 is a sectional view of a portion of the machine taken on the line 5—5 of Fig. 4.

Figure 1:
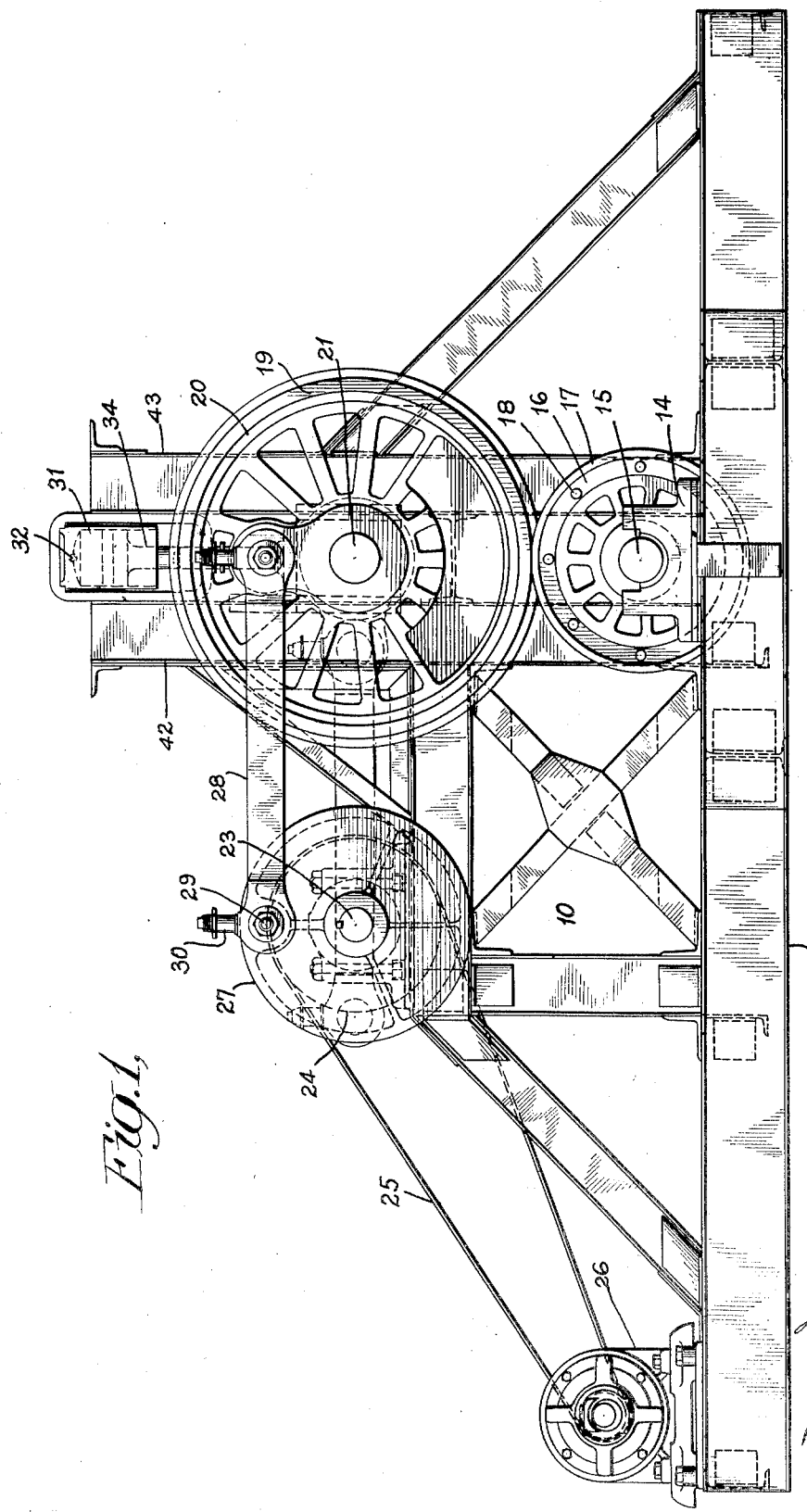
Figure 1 is a view in side elevation of a testing machine constructed in accordance with this invention.
Figure 7:
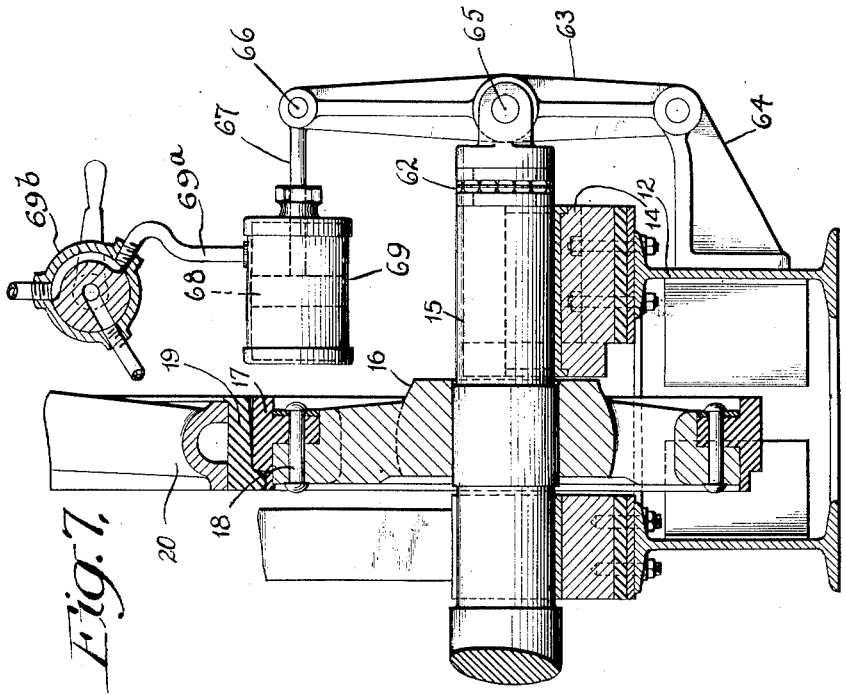
Figure 7 is an enlarged partially sectional view of a portion of the machine.
Figure 3:
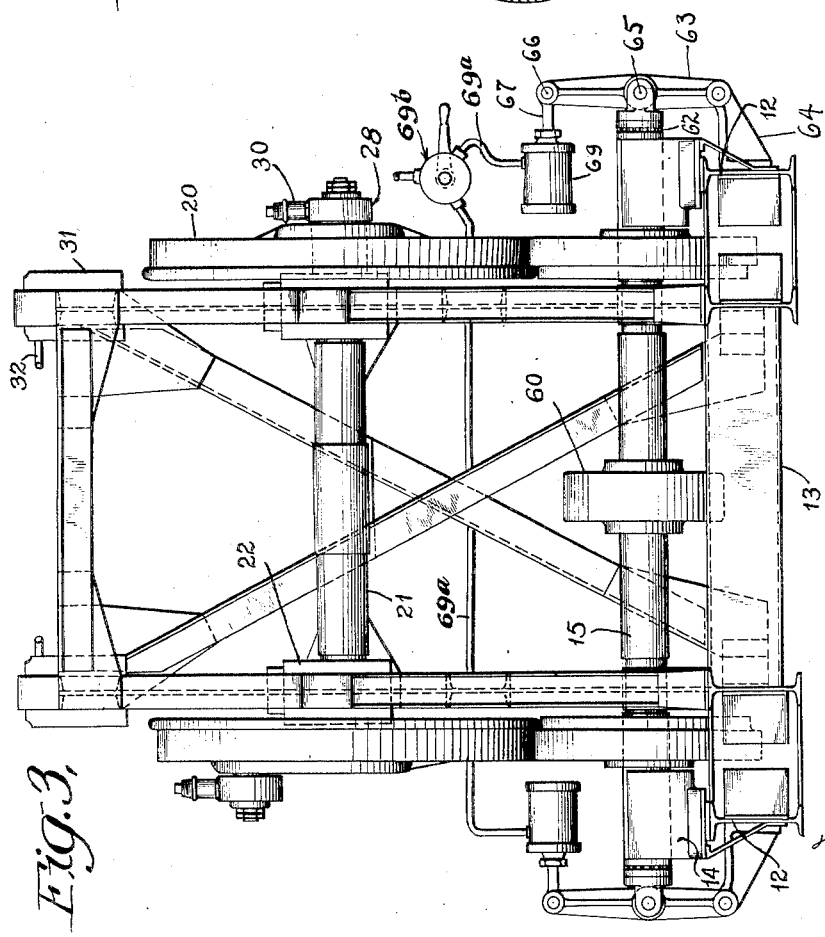
Figure 3 is a view in end elevation of the same machine.
Figure 6:
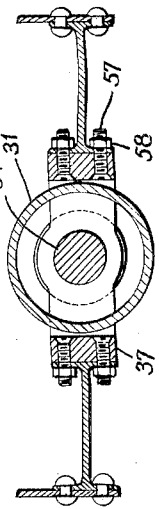
Figure 6 is a sectional plan view taken on the line 6—6 of Fig. 4.

In a locomotive lateral movement of the driving axles is movement in a direction parallel to the center line of the axle or at a right angle to the direction of motion of the locomotive along the track. Longitudinal motion is in a direction parallel to the movement of the locomotive along the track and at a right angle to the center line of the axle. The words "lateral" and "laterally" and "longitudinal" and "longitudinally" will be used in this sense throughout the specification and claims.

Referring to the drawings, the machine comprises in general, a supporting frame 10, supporting wheels 16, driving wheels 20, journal boxes 22, means including a piston 33 for applying pressure to the journal bearings and means for operating the driving wheels.

Considering the invention in detail, it will be seen by reference to the drawings, that the supporting frame 10 comprises a base 11 and suitable uprights and inclined bracing members. The base 11 consists of a plurality of horizontally disposed I-beams 12, suitably secured in spaced relation by cross beams 13. Bearing blocks 14 are secured on opposite sides of the base 11 and support a rotatable shaft or axle 15. Near each end of the shaft 15, a supporting wheel 16 is mounted to rotate with the shaft. Each supporting wheel 16 is provided with a tire 17 turned down to represent the exact cross section of one side of the head of a rail and secured to the wheel by bolts 18. The supporting wheels 16 represent the tracks upon which a locomotive runs.

Driving wheels 20 having standard flanged tires 19 are secured to and rotate with a shaft or axle 21 and are disposed directly above and in contact with the supporting wheels 16, the flange engaging the turned down portion of the tire 17. The shaft 21 supports journal boxes 22, 22 which are guided in the framework but not secured thereto in any manner, the entire weight of the driving wheels 20 axle 21 and the journal boxes 22, 22 being carried by the supporting wheels 16 and axle 15.

A crank shaft 23 is rotatably mounted in the frame in the same horizontal plane with the shaft 21 and a pulley 24, which is driven by a belt 25 from a motor 26, is mounted thereon. The crank shaft 23 supports a pair of wheels 27 which are connected to the driving wheels 20 by means of connecting rods 28 which are pivotally connected to the wheels as at 29, the position of the connecting rods on the wheels being the same as on a locomotive in order to obtain the reciprocating and revolving action desired. The connecting rods 28 are provided with the customary oil or grease cups 30 for lubricating the connections between the rods and the wheels. Rod cup greases may also be tested by means of these grease cups.

Referring more particularly to Figs. 1 and 4, it will be seen that means are provided for exerting pressure on the journal boxes 22, 22 so that the journals may be subjected to pressures corresponding to the pressures to which locomotive journals are commonly subjected. These means consist of hydraulic load cylinders 31, 31 which are supported in the framework and provided with supply pipes 32 leading to a source of hydraulic pressure, such as an accumulator (not shown).

A piston 33 on the end of a piston rod 34 works within each of the cylinders, being provided at its head with a cup leather packing arrangement 35. Each piston rod is provided with an extension 36 which is guided by passing through an opening in the lower part of a guide 37, which is secured between the I-beams 42 and 43 by bolts 57 and nuts 58, the guide 37 serving also as a support for the hydraulic load cylinder and also as a tie or binder for the pedestals 42 and 43. The lower end of each piston rod extension 36 is formed with an outwardly projecting annular shoulder 38 forming a seat for one end of a pair of concentrically arranged coil springs 39 and 40. The lower ends of the springs 39 and 40 rest upon a saddle 41 which is mounted upon the top of each journal box 22. The springs 39 are constructed of relatively light material and are mounted within the larger and heavier springs 40, thus following the common practice employed in springs for freight car trucks.

The object of the springs is to absorb the vibrations and shocks due to irregularities in the tread of the driving wheels on the supporting wheels, which causes the driving axle 21 and wheels 20 to move vertically a small amount. These vibrations and shocks are similar to those to which locomotive wheels are subjected due to an uneven track. The absorption of these shocks by the springs prevents the transmission of these forces to the pistons and to the accumulator. By preventing the transmission of such forces to the accumulator extreme fluctuations of pressure on the bearings are prevented.

Each journal box 22 is mounted within two I-beams 42 and 43 which constitute a part of the frame-work of the machine and which are commonly spoken of as pedestals or pedestal jaws. A shoe 44 is welded to the jaw 42. A tapered bar 45 is welded to the jaw 43. An adjustable tapered wedge 46 is adapted to cooperate with the tapered bar 45. The action of the tapered members is apparent; the wedge 46 has an adjusting stud 47 extending through a pedestal binder 48 secured at its ends to the I-beams 42 and 43 and adjusting nuts 49 disposed on opposite sides of the rigid members so that the adjustable wedge may be moved up or down as may be necessary in order to provide a fairly close fit with the journal box 22. In this way the journal box is guided. The journal box itself is not supported by any of the frame-work in the machine, but rests upon the journal so that the pressure derived from the accumulator and transmitted through the piston 33 is exerted on the journal, so that any desired weight corresponding to the weights to which locomotive journals are in practice subjected may thus be exerted on the journals. In mounting the journal box, it is pushed against the shoe 44 and the adjusting wedge 46 is moved upward to such an extent as may be necessary to allow merely a slight movement of the journal box 22. In other words, the shoe and wedge restrict the longitudinal movement of the box within relatively narrow limits.

The journal boxes are preferably of standard construction having the usual crown brass 50 extending over the top of the shaft 21, and underneath the shaft, a well known type of lubricating box or grease cellar consisting of a perforated plate 51 bearing against the shaft 21 and a spring pressed plate 52 which forces the grease cake 53 being tested against the perforated plate 51. Thermocouples 54 suitably connected to recording pyrometers are placed in the crown brass 50 and in the lubricating cake 53. A coil spring 55 seated on each of the base plates 56 of the grease cellars forces the spring pressed plates 52 against the grease cake 53.

From the foregoing it is apparent that when the driving wheels are operated any amount of pressure desired can be applied to the journals by means of the piston operating within the cylinder 31 so that the continued operation of the wheels with the load upon them produces the same effect upon the journal bearings as that obtained in the operation of a locomotive. By reason of the reciprocating means for operating the wheels 20 the longitudinal movement to which the driving wheels of locomotives are subjected is simulated. The journals are thus subjected to stresses and strains which both in the degree of pressure exerted and in the character or type of strain are identical or at least analogous to those strains and stresses to which driving journals are subjected in practice. The longitudinal movement referred to above, enables the grease being tested, to feed properly to the journal bearings and is a very necessary action in a grease lubricated bearing.

A water brake shown generally at 60 is provided on the shaft 15 for placing a predetermined load on the shaft on which are mounted the supporting wheels 16. The water-brake may be of any desired type such, for example, as the well known Junkers or Alden brake. By regulating the inflow and outflow of water to the brake mechanism, the amount of resistance can be regulated. The resistance thus imposed on the shaft 15, is transmitted by the supporting wheels 16 to the driving wheels 20 and thus tends to retard the motion of the driving wheels 20; this results in an increased tendency toward longitudinal motion of the driving axle 21 in the journal box 22 and thus the condition existing when a locomotive is pulling a train of cars is simulated.

A locomotive rounding a curve is thrown by centrifugal force towards the outer rail and at such times the pressure between the outer rail and the wheels riding thereon is considerably greater than when the locomotive is travelling along a straight track. This lateral thrust of the weight of the locomotive is concentrated on the adjacent bearing surfaces of the driving box face and the driving wheel hub face and at that point there is considerable friction which generates heat which is transmitted through the driving journal and through the driving box bearing to the bearing surface and to the lubricant provided therefor. This effects both the lubricant actually on the bearing surfaces and also the supply of lubricant in the driving box grease cellar. In order to simulate as nearly as possible such conditions in the present testing machine wherein there is no lateral movement of the driving wheel shaft 21, means are provided for moving the shaft 15 and the supporting wheels 16 which are mounted thereon in a lateral or endwise direction so that the pressure between one of the supporting wheels and one of the driving wheels 20 can be increased as desired and the force transmitted to the hub faces as indicated at 61. The manner in which the shaft 15 is mounted provides for limited lateral or endwise movement in either direction, and at each end of the shaft there is provided a thrust bearing 62 of any suitable design, either a flat plate or ball bearing. Each thrust bearing 62 is pivotally connected as at 65 to a load beam 63 which is fulcrumed at its lower end to a bracket 64 suitably secured to one of the I-beams 12. The upper end of each load beam 63 is pivotally secured as at 66 to the outer end of a piston rod 67, the inner end of which is provided with a piston 68 which operates within a pressure cylinder 69. The pressure cylinders 69, 69 may be operated either by means of air or water, the use of air being preferred, as it is inexpensive and instantaneous in operation. Each cylinder 69 is provided near one end with a fluid pressure inlet line 69$^a$ both of which extend to a source of supply (not shown) through a three-way valve 69$^b$ so that pressure may be applied alternately to either of the pressure cylinders while the other cylinder is vented to the atmosphere. It is understood that each of the cylinders is provided with an air vent (not shown) at the end opposite the air inlet connection. One of the pressure cylinders is positioned at each end of the shaft 15, for obtaining the lateral or endwise thrust on either side of the machine.

During the operation of the testing machine it may be desirable at certain intervals to apply pressure to the supporting wheels 16 and at such times the three-way valve is operated to admit fluid pressure to either of the cylinders 69 as may be desired. The load beam 63 is actuated by the movement of the piston 68 within the cylinder 69 and in turn pressure is exerted on the thrust bearings 62 for moving the shaft 15 and the supporting wheels 16 carried thereby so as to bring the driving box and wheel hub faces on one side into close contact, thereby producing the necessary friction and resulting heat.

Inasmuch as the water brake 60 is carried by the shaft 15, suitable means may be provided for flexibly anchoring the water brake in position while at the same time permitting the lateral movement of the shaft together with the water brake upon which it is mounted.

The operation of the apparatus is apparent. The grease cake 53 or other lubricant it is desired to test is placed in position in the lubricating boxes of the journals and the machine operated at such speed, under such loads and for such durations of time as may be desired. The temperature recorded by the thermocouples 54 is observed and the grease cake is examined at the end of the operation to note what, if any, deteriorating effects it has suffered. Careful inspection is also made at the end of a test to note the amount of wear in journal or bearings, conditions of lubricant, and related matters.

Apparatus of preferred form and construction has been illustrated and described for the purpose of showing a way in which this invention may be practiced, but the inventive thought upon which this application is based is broader than the illustrative embodiment thereof. It is, therefore, understood that the scope of the invention is not to be limited by the present disclosure, reference being had to the appended claims for that purpose.

What I claim is:

1. A testing machine comprising, a frame, a pair of spaced supporting wheels operatively mounted on the frame, a pair of spaced driving wheels disposed directly above and supported by the supporting wheels, an axle connecting the driving wheels, a journal box disposed near each end of and supported on the axle, means for operating the driving wheels, and means for exerting variable pressures on the journal boxes.

2. A testing machine comprising, a frame, a pair of spaced supporting wheels operatively mounted on the frame, a pair of spaced wheels disposed directly above and supported by the supporting wheels, an axle connecting the driving wheels, a journal box disposed near each end of and supported on the axle, a lubricating box disposed against the under side of the axle beneath each of the journal boxes and comprising a perforated plate adapted to bear against the axle, a lubricating member disposed against one side of said plate, resilient means for continuously forcing the lubricating member against the perforated plate, means for operating the driving wheels, and means for exerting pressure on the journal boxes.

3. A testing machine comprising, a frame, a pair of spaced supporting wheels operatively mounted on the frame, a pair of spaced driving wheels disposed directly above and supported by the supporting wheels, an axle connecting the driving wheels, a journal box disposed near each end of and supported on the axle, means for operating the driving wheels including a motor, a pair of spaced rotatable wheels operated from said motor, and connecting rods connecting said wheels with the driving wheels, and means for exerting hydraulic pressure on the journal boxes.

4. A testing machine comprising, a frame, rotatably mounted spaced supporting wheels, spaced pedestal jaws vertically disposed on the frame, journal boxes disposed between and guided by said jaws, adjustable means for positioning and limiting the longitudinal movement of the journal boxes, a rotatable shaft mounted in said journal boxes, a driving wheel mounted near each end of said shaft and supported by one of the supporting wheels, and means for operating said driving wheels.

5. A testing machine comprising a frame, rotatably mounted spaced supporting wheels, two pairs of spaced pedestal jaws vertically disposed on opposite sides of the frame, a journal box disposed between and guided in each pair of jaws, adjustable means for positioning and limiting the longitudinal movement of the journal boxes including a shoe secured to one jaw of each pair of pedestal jaws, a tapered bar attached to the opposite jaw of each pair of pedestal jaws, an adjustable wedge adapted to cooperate with each of the tapered bars, a rotatable shaft mounted near its end in the journal boxes, a driving wheel mounted near each end of the shaft and supported by one of the supporting wheels, and means for operating the driving wheels.

6. A testing machine for simulating conditions in locomotive journal bearings comprising, a frame, spaced supporting wheels rotatably mounted on the frame, journal boxes positioned within the frame, a driving axle supported near its ends in the journal boxes, driving wheels mounted on the axle and means mounted on each of said journal boxes for exerting varying pressures thereon and including a pressure cylinder rigidly mounted in the frame, a piston operating within the cylinder, a piston rod operated by said piston, and resilient means disposed between said rod and said journal box and adapted to absorb shocks due to vibrations of the journal boxes.

7. A testing machine comprising a pair of wheels, an axle connecting and upon which said wheels are mounted, journal boxes for said axle, means for exerting a predetermined pressure on the journal boxes, connecting rods for operating said wheels, and means for supplying power to said connecting rods.

8. A testing machine for lubricants, comprising a frame, an axle supported in said frame, supporting wheels mounted on said axle and adapted to rotate therewith, driving wheels positioned above said supporting wheels and supported thereby, means for operating said driving wheels, means for exerting varying pressures on said driving wheels, and means for applying a variable braking force to the axle upon which the supporting wheels are mounted.

9. A testing machine comprising a frame, a laterally movable axle supported in said frame, supporting wheels mounted on said axle and adapted to rotate therewith, driving wheels positioned above said supporting wheels and supported thereby, means for operating said driving wheels, and means cooperating with said laterally movable axle for delivering a lateral thrust thereto.

10. A testing machine comprising a frame, a laterally movable axle supported in said frame, supporting wheels mounted on said axle and adapted to rotate therewith, driving wheels positioned above said supporting wheels and supported thereby, means for operating said driving wheels, a load beam pivotally connected to the frame and to the laterally movable axle, and means for applying pressure to the free end of the load beam to impart a lateral thrust to said axle.

11. A testing machine comprising a frame, an axle journaled in said frame, spaced supporting wheels mounted on said axle, driving wheels positioned above and supported by said supporting wheels, the driving wheels each having a flanged tire adapted to engage a peripheral edge of one of the supporting wheels, an axle connecting said driving wheels, means for operating said driving wheels, means for applying varying pressures to said driving axle and said driving wheels, means for applying lateral thrusts to said driving wheels, and a lubricating member for lubricating said axle during the rotation thereof under the varying thrusts and pressures imposed thereon.

12. A testing machine comprising a frame, an axle journaled in the frame and adapted for limited lateral movement, and means for applying varying pressures to the opposite ends of the axle.

13. A testing machine comprising a frame, an axle journaled in the frame and adapted for limited lateral movement, and means including a pressure cylinder for applying lateral thrusts to the axle.

14. A testing machine comprising a frame, an axle journaled in the frame and adapted for limited lateral movement in both directions, and means for alternately applying lateral thrusts to the opposite ends of the axle.

15. A testing machine comprising a frame, an axle journaled in the frame, supporting wheels mounted on the axle and adapted to rotate therewith, a tire secured to each of the supporting wheels and provided with a turned down portion representing the cross section of one side of the head of a rail, driving wheels positioned above the supporting wheels and supported thereby, a flanged tire on each of the driving wheels, the flange being adapted to engage the turned down portion of the tire on the corresponding supporting wheel, means for operating the driving wheels, and means for applying a lateral thrust to the driving wheels during the operation thereof.

16. A testing machine comprising a frame, journal boxes guided in the frame, a driving axle positioned in the frame and supporting the journal boxes, pressure actuated pistons for applying predetermined and variable pressures on the journal boxes, and means interposed between the pistons and the journal boxes for preventing the transmission of vibrations of the axle through the journal boxes to the pistons.

17. A testing machine comprising a pair of spaced wheels, an axle connecting and upon which the wheels are mounted, journal boxes supported on the axle, pressure actuated pistons for imposing predetermined and variable pressures on the journal boxes, means for operating the wheels, and resilient means interposed between the pistons and the journal boxes for preventing the transmission of vibrations of the axle through the journal boxes to the pistons.

In witness whereof I have hereunto set my hand this 19th day of November, 1924.

HOWARD G. HILL.